(12) United States Patent
Mellott, II et al.

(10) Patent No.: US 8,216,681 B2
(45) Date of Patent: Jul. 10, 2012

(54) REFLECTIVE ROOFING MATERIALS

(75) Inventors: Joseph W. Mellott, II, Stow, OH (US);
Jason D. Smith, Strongsville, OH (US)

(73) Assignee: Garland Industries, Inc., Cleveland, OH (US)

(*) Notice: Subject to any disclaimer, the term of this patent is extended or adjusted under 35 U.S.C. 154(b) by 0 days.

(21) Appl. No.: 12/777,552

(22) Filed: May 11, 2010

(65) Prior Publication Data
US 2010/0218876 A1 Sep. 2, 2010

Related U.S. Application Data

(62) Division of application No. 11/899,835, filed on Sep. 7, 2007.

(51) Int. Cl.
*B32B 27/00* (2006.01)
(52) U.S. Cl. ......................... 428/421; 52/408
(58) Field of Classification Search .................. 52/408, 52/518, 746.11; 428/141, 142, 144, 421
See application file for complete search history.

(56) References Cited

U.S. PATENT DOCUMENTS

| | | | |
|---|---|---|---|
| 2,379,358 A | 6/1945 | Jewett | |
| 3,255,031 A | 6/1966 | Lodge et al. | |
| 3,479,201 A | 11/1969 | Sloan | |
| 3,528,842 A | 9/1970 | Skadulis | |
| 4,120,132 A | 10/1978 | Kendrick | |
| 4,288,959 A | 9/1981 | Murdock | |
| 4,478,869 A | 10/1984 | Brady | |
| 5,088,259 A | 2/1992 | Myers | |
| 5,132,164 A * | 7/1992 | Moriya et al. | 428/199 |
| 5,456,785 A | 10/1995 | Venable | |
| 5,474,838 A | 12/1995 | Callaway | |
| 5,540,971 A | 7/1996 | Daurer | |
| 5,573,810 A | 11/1996 | Grubka | |
| 5,620,554 A | 4/1997 | Venable | |
| 5,643,399 A | 7/1997 | Venable | |
| 5,695,373 A | 12/1997 | Blackmore | |
| 5,813,176 A | 9/1998 | Tzeng | |
| 5,965,626 A | 10/1999 | Tzeng | |
| 6,110,846 A | 8/2000 | Brzozowski | |
| 6,194,519 B1 | 2/2001 | Blalock | |
| 6,207,593 B1 | 3/2001 | Fields | |
| 6,296,912 B1 | 10/2001 | Zickell | |
| 6,296,921 B1 | 10/2001 | Blackmore | |
| 6,341,462 B2 | 1/2002 | Kiik | |
| 6,360,511 B1 | 3/2002 | Brzozowski | |
| 6,502,360 B2 | 1/2003 | Carr, III et al. | |
| 6,811,859 B2 * | 11/2004 | Bonnet et al. | 428/216 |
| 6,933,007 B2 | 8/2005 | Fensel | |
| 7,070,844 B2 * | 7/2006 | Bartek | 428/40.1 |

(Continued)

OTHER PUBLICATIONS

Technology and material design in PVDF protected thermoplastic substrates, David Silagy; Journal of Fluorine Chemistry 104 (2000) 79-86.

*Primary Examiner* — Brian Glessner
*Assistant Examiner* — Daniel Kenny
(74) *Attorney, Agent, or Firm* — Fay Sharpe LLP; Brian E. Turung (57) ABSTRACT

A roofing and/or siding material having a resulting reflectivity of at least about 50%. The roofing and/or siding material includes a base sheet/membrane, a reinforcement material and a multi-layer reflective film material.

23 Claims, 1 Drawing Sheet

U.S. PATENT DOCUMENTS

| | | |
|---|---|---|
| 2004/0071938 A1 | 4/2004 | Fensel |
| 2005/0139126 A1 | 6/2005 | Khan |
| 2005/0145139 A1 | 7/2005 | Khan |
| 2005/0250399 A1 | 11/2005 | Khan et al. |
| 2005/0257875 A1 | 11/2005 | Khan |
| 2005/0261407 A1 | 11/2005 | Khan |
| 2005/0261409 A1 | 11/2005 | Khan |
| 2006/0240224 A1 | 10/2006 | Khan |
| 2007/0054129 A1* | 3/2007 | Kalkanoglu et al. .......... 428/413 |
| 2009/0053529 A1* | 2/2009 | Kenney et al. ................ 428/422 |

* cited by examiner

REFLECTIVE ROOFING MATERIALS

The present application is a divisional of U.S. patent application Ser. No. 11/899,835 filed Sep. 7, 2007.

The present invention relates to a roofing and/or siding materials, and more particularly to improved rooting and/or siding materials having increased reflectivity.

INCORPORATION BY REFERENCE

U.S. Pat. Nos. 2,379,358; 3,255,031; 3,479,201; 3,528,842; 4,120,132; 4,288,959; 4,478,869; 5,088,259; 5,456,785; 5,474,838; 5,540,971; 5,573,810; 5,620,554; 5,643,399; 5,695,373; 5,813,176; 5,965,626; 6,110,846; 6,194,519; 6,207,593; 6,296,912; 6,296,921; 6,341,462; 6,360,511; 6,502,360; and 6,933,007; and United States Patent Publication Nos. 20040071938 published on Apr. 15, 2004; 2005/0139126 published Jun. 30, 2005; 2005/0145139 published Jul. 7, 2005; 2005/0250399 published Nov. 10, 2005, 2005/0257875 published Nov. 24, 2005; 2005/0261407 published Nov. 24, 2005; 2005/0261409 published Nov. 24, 2005; 2006/0240224 published Oct. 26, 2006; and 2007/0054129 published Mar. 8, 2007, all of which are incorporated herein by reference to illustrate various types of roofing and/or siding systems on which the present invention can be used, to also illustrate various manufacturing techniques for making such roofing and/or siding systems.

BACKGROUND OF THE INVENTION

In North America, asphalt-based roofing materials are a popular medium for covering roofs of homes and other structures. Asphalt-based roofing materials typically come in shingle or roll form, the shingle being the more widely used material. A typical asphalt shingle has an asphalt substrate and a multitude of granules placed thereon.

As energy prices have risen, the demand for energy efficient roof systems has increased. In certain communities, building codes have been issued to require more energy efficient buildings. Energy-efficient roofing materials can result in cooler roof surfaces and less energy spent to cool a building. As such, energy-efficient roofing materials can reduced building cooling costs. The use of energy efficient roof coatings can also reduce the amount of roof insulation required in a building.

Due to the demand of energy-efficient roofing materials, several roofing systems have been developed. One type of energy-efficient roofing material is disclosed in U.S. Pat. No. 6,933,007 discloses the use of reflective granules on a roofing material to form energy-efficient roofing materials. U.S. patent application Ser. No. 10/951,973 filed Sep. 29, 2004, which is incorporated herein by reference discloses a paint applied to a roofing material to form energy-efficient roofing materials.

Various types of acrylic coatings have been used on roofing materials to form energy-efficient roofing materials. For example, white, water-based acrylic coatings have been found to provide the highest reflectivity and longevity. White reflective coatings also typically minimize heat damage to roof membranes, increasing their expected service lives. Acrylic coatings primarily are formulated with pigments, acrylic polymers and water. There may be other additives, such as fibers for reinforcement, glycol for freeze thaw resistance, intumescant or other fire-retardant additives, or biocides to prevent fungal growth in the container. Historically, prior art white, water-based acrylic coatings have problems maintaining roof surface reflectivity. For instance, reflectivity can decrease significantly during the first year of a roofs life. Changes in reflectivity are related to changes with the coating itself (e.g., coating-erosion or cracking) and/or accumulation of particulate matter (e.g., dirt) from the environment.

Some prior art acrylic coatings have been applied directly to granule-surfaced modified bitumen roof membranes on new roof systems. Granules are difficult to coat because of their rough, uneven surface areas. Moisture and air pockets can be trapped under the acrylic coating and lead to blisters or pinholes in the cured acrylic coating. As such, inconsistent coverage and potential cracking of areas where the coating is applied too heavily are additional problems related to application of previous acrylic coatings.

In view of the current state of the art there is a continuing need for new and improved coating compositions that may be applied in-plant during manufacture of the roofing/siding membrane. In particular, a coating composition is needed that is reflective, energy efficient, as well as durable and easy to apply.

SUMMARY OF THE INVENTION

The present invention relates to roofing and/or siding materials and a method of making such materials having improved reflectivity. The present invention is applicable to many types of roofing and/or siding materials including, but not limited to, shingles, cap sheet roll roofing, modified bitumen, metal roofing and/or siding, plastic roofing and/or siding, and wood roofing and/or siding. The present invention is particularly applicable to prefabricated roofing systems such as, but not limited to, shingles, cap sheet roll roofing, modified bitumen, metal roofing and/or siding, plastic roofing and/or siding, and wood roofing and/or siding wherein the roofing materials are manufactured off site and then subsequently installed on a roof and/or siding of a building or other type of structure.

Roofing systems having a bitumen- or asphalt-based water-resistant layer are well-known. Due to their chemical composition, these water-resistant layers are highly absorptive of radiation. In fact, these roofing layers may be regarded in an uncoated state as black-body absorbers; that is, they effectively absorb almost all of the radiation that impinges upon them. Such surfaces absorb radiation, thereby resulting in increased temperature which can result in thermal degradation of the roofing system and/or increase the cooling costs of the roofed structure.

Roofing and/or siding shingles and cap sheet roll roofing and/or siding usually employ a web of fibrous base material. The base material typically is a nonwoven fabric such as, but not limited to, felt (organic, glass fiber, polyester, polypropylene, etc.), fiberglass, or similar materials, which are commonly coated with a material. One non-limiting material is a bituminous composition such as, but not limited to, bitumens, modified bitumens, tars, pitches, asphalt, and the like. As can be appreciated, other types of coatings (e.g., polymers, etc.) can be use as an alternative coating or in conjunction with a bituminous composition. The bituminous composition can include a filler such as, but not limited to, inorganic fillers or mineral stabilizers, organic materials such as polymers, recycled streams, or ground tire rubber, slate flour and/or powdered limestone. A solid material such as, but not limited to, granules can be pressed into the layer of bituminous composition while it is in a warm, softened condition; however, this is not required. Finely divided materials such as, but not limited to, mica flakes, talc, silica dust or the like can be applied and/or made adherent to the non-weather exposed surface of the shingle to prevent sticking of the adjacent layers of the material when placed in packages or shipment or storage; however, this is not required. Non-limiting examples of shingles are disclosed in U.S. Pat. Nos. 6,194,519; 6,296,912; and 6,341,462, which are incorporated herein by reference. These shingles or a modified version of these shingles can be formed by the manufacturing process of the present invention to form highly reflective shingles. The process of the present invention can be used to form such shingles off site at a manufacturing facility and then have such shingles delivered to a construction site for installation of a building or other type of structure.

Modified bitumen materials that incorporate the use of a composite fabric are at least partially impregnated with a bituminous composition. The composite fabric typically includes, but is not limited to, a layer of woven or nonwoven material connected to one or more layers of low shrinkage warp strands and/or one or more layers of low shrinkage weft strands. The layers are typically stitched together, knitted together, at least partially melted together or otherwise bound together to maintain the integrity of the fabric. The resultant fabric may be coated with a resin or sizing to prevent slippage between the several layers of the fabric and impart a measure of stiffness to the fabric; however, this is not required. The fibers comprising the warp stands, the weft strands, and/or the woven or nonwoven material can include fibers selected from a variety of sources such as, but not limited to, natural materials, polymeric materials, inorganic materials or combinations thereof. Non-limiting examples of such fibers include polycrystalline fibers, fiberglass, thermoplastic fiber filaments (e.g., polyamide fibers of poly (p-phenylene terephthalate), poly (o-phenylene terephthalamide), ultra low shrink polyester), cotton, cellulose, natural rubber, flax, ramie, hemp, sisal, wool, linen (flax), paper, wood pulp, polyamides, polyesters, acrylics, polyolefins, polyurethanes, vinyl polymers, and derivatives, or mixtures thereof. The fibers can be continuous filaments, fibers, strands and/or yarn; however, this is not required. Similar to shingles, the composite fabric is coated with coating material such as, but not limited to a bituminous material such as, but not limited to, bitumens, modified bitumens, tars, pitches, asphalt, and the like. The composite fabric can also be coated with a solid material such as, but not limited to, granules that are then at least partially pressed into the layer of bituminous material while it is in a warm, softened condition; however, this is not required. Non-limiting examples of modified bitumen materials are disclosed in U.S. Pat. Nos. 5,474,838; 5,540,971; 5,695,373; 6,296,921, which are incorporated herein by reference. These modified bitumen materials or a modified version of these materials can be formed by the manufacturing process of the present invention to form a highly reflective modified bitumen materials. The process of the present invention can be used to form such materials off site at a manufacturing facility and then have such materials delivered to a construction site for installation of a building or other type of structure.

The present invention is particularly directed to a roofing and/or siding system that has a resulting reflectivity of at least about 50%, and more particularly at least about 60% and will be particularly described with reference thereto. Resulting reflectivity or solar reflectance is defined as the fraction of solar flux reflected by a surface expressed as a percent from 0-100% or within the range of 0.00 and 1.00. The improved reflectivity of the roofing and/or siding system provides several benefits to the roofing and/or siding system. The increased resulting reflectivity of the roofing and/or siding system reduces the temperature of the surface of the roofing and/or siding system, especially on warm, sunny days. The reduced surface temperature of the roofing and/or siding system reduces the amount of heat transfer from the surface of the roofing and/or siding system to the structure positioned adjacent the roofing and/or siding system. As a result, less energy is required to maintain the structure adjacent the roofing and/or siding system at a cooler temperature. The reduced surface temperature of the roofing and/or siding system also reduces the contribution of the roofing and/or siding system as an urban heat island, which can have negative effect on air quality in urban areas. As a result, the improved roofing and/or siding system is more environmentally friendly. The increased reflectivity of the roofing and/or siding system also increases the life of the roofing and/or siding system. Increased roof temperatures result in the increased rate of degradation to the materials that make of the roofing and/or siding system (e.g., bitumen, modified bitumen, asphalt, woven materials, nonwoven materials, adhesives, etc.). In addition to the adverse of effects of high temperatures, sunlight, especially UV light, can increase the rate of degradation of the materials that make up the roofing and/or siding system. The improved reflectivity of the roofing and/or siding system of the present invention can increase the life of the roofing and/or siding system by reducing the surface temperature of the roofing and/or siding system, thus reducing the rate of thermal degradation. The improved reflectivity of the roofing and/or siding system of the present invention also can increase the life of the roofing and/or siding system by reducing the amount of sunlight that penetrates into the surface of the roofing and/or siding system. The improved reflectivity of the roofing and/or siding system of the present invention can also enable the rooting system to be classified as a "cool roof". Such a rooting classification can provide many advantages for buildings such as, but not limited to, tax incentives, relaxation of various envelope criteria of a building with respect to energy classifications, etc. In one embodiment of the present invention, the average resulting reflectivity of the roofing and/or siding system is at least about 55%. In one aspect of this embodiment, the average resulting reflectivity of the roofing and/or siding system is at least about 60%. In another and/or alternative aspect of this embodiment, the average resulting reflectivity of the roofing and/or siding system is at least about 65%. In still another and/or alternative aspect of this embodiment, the average resulting reflectivity of the roofing and/or siding system is about 70-99.9%. In yet another and/or alternative aspect of this embodiment of the invention, the average resulting reflectivity of the roofing and/or siding system that includes a bitumen material or modified bitumen is at least about 60%.

In one non-limiting aspect of the present invention, a novel reflective film material is applied to a roofing and/or siding system to significantly increase the reflectivity of the roofing and/or siding system. The novel reflective film material is generally a light colored material such as, but not limited to a white colored material. In accordance with the present invention, the novel reflective film material provide energy efficacy, high reflectivity, durability, to the roofing and/or siding system and is easy to apply to various types of roofing and/or siding systems. In one non-limiting embodiment of the invention, the reflectivity provided by the reflective film material can be designed to meets today's ENERGY STAR® standards. In another and/or alternative non-limiting embodiment of the invention, the reflective film material is a white or generally white coating that can be secured directly or indirectly to various roof and/or siding substrates (e.g., modified bitumen membranes [i.e., SBS membranes, APP membranes, SEBS membranes, SBR membranes, coal tar membranes, etc.], asphalt membranes, metal surfaces, plastic surfaces, wood surfaces, etc.).

In another and/or alternative non-limiting aspect of the present invention, the roofing and/or siding system includes a base sheet/membrane; a reinforcement material; and a reflective film material. The reflective film material generally constitutes the upper layer of the roofing and/or siding material. The base sheet/membrane can include or be formed of metal, wood, plastic, bitumen membrane, modified bitumen membrane, asphalt membrane, etc. The base sheet can be formed by standard processes as disclosed in one or more of the patents or patent applications that are incorporated herein by reference. The reinforcement material is generally formed of one or more layers of woven and/or nonwoven material. The reinforcement material is generally formed of one or more materials such as, but not limited to, glass fibers, carbon fibers, and/or polymeric fibers (e.g., polyester, fiber glass reinforced polyester, nylon, Kevlar, etc.). The reflective film material is a multilayer system that includes polyvinylidene fluoride and vinyl polymer. The reflective film material has a thickness that is generally thinner than the thickness of the base sheet/membrane. Generally, the thickness ratio of the base sheet/membrane to the reflective film material is generally at least about 1.5:1, typically at least about 2:1, more typically about 5-250:1, and even more typically about 20-100:1; however, other thickness ratios can be used. The thickness of the reflective film material is generally at least about 0.5 mil (0.0005 inch), typically at least about 1 mil, and more typically about 1-20 mils; however, other thickness can be used. The reinforcement material also has a thickness than is generally thinner than the thickness of the base sheet/membrane. Generally, the thickness ratio of the base sheet/membrane to the reinforcement material is generally at least about 1.5:1, typically at least about 2:1, and more typically about 5-100:1; however, other thickness ratios can be used. The thickness of the reinforcement material is generally at least about 1 mil (0.001 inch), typically at least about 1.5 mils, and more typically about 2-100 mils; however, other thickness can be used.

In still another and/or alternative non-limiting aspect of the present invention, the roofing and/or siding system is formed by reflective film material being at least partially secured to the base sheet/membrane via the reinforcement material. The reinforcement material can be 1) at least partially secured to the reflective film material prior to the reflective film material and the reinforcement material being secured to the base sheet/membrane, 2) at least partially secured to the base sheet/membrane prior to the reflective film material being secured to the base sheet/membrane, or 3) unsecured to the base sheet/membrane and reflective film material prior to the reflective film material and the reinforcement material being secured to the base sheet/membrane. In one non-limiting embodiment of the invention, the reinforcement material is at least partially secured to the base sheet/membrane and/or reflective film material by lamination and/or other type of heating process, and/or by the use of an adhesive. In one non-limiting process arrangement, the reinforcement material is at least partially secured to the reflective film material by a lamination process and/or by the use of an adhesive prior to the reinforcement material and the reflective film material being secured to the base sheet/membrane. When the base sheet/membrane is a bitumen membrane, modified bitumen membrane, asphalt membrane, or the like, the secured together reinforcement material and the reflective film material is generally secured to the base sheet/membrane by a heat process. In this process, the reinforcement material and the reflective film material can be laminated to the base sheet/membrane by heating the surface of the base sheet/membrane above its softening temperature, and then applying the reinforcement material and the reflective film material to the softened surface and permitting the softened material to partially saturate or intermingle with the reinforcement material and/or melt/bond with the reflective film material. As can be appreciated, an adhesive can also be used to facilitate in securing the reinforcement material and the reflective film material to the base sheet/membrane; however, this is not required. Pressure (e.g., via pressure rollers, etc.) can be used to facilitate in securing one or more of the layers of the roofing and/or siding system together; however, this is not required.

In yet another and/or alternative non-limiting aspect of the present invention, the reflective film material is formed of multiple layers. In one non-limiting embodiment of the invention, a first layer of the reflective film material includes at least about 70 weight percent polyvinylidene fluoride. One non-limiting commercially available source of polyvinylidene fluoride is Kynar® offered by Arkema, Inc. Several attributes of polyvinylidene fluoride include a) high mechanical strength and toughness, b) high abrasion resistance, c) high thermal stability, d) high dielectric strength, e) resistant to most chemicals and solvents, f) resistant to ultraviolet radiation, g) resistant to weathering, h) resistant to fungi, i) low permeability to most gases and liquids, j) low flame and smoke characteristics, and k) can be flexible. The first layer of the reflective film material is generally a generally clear layer; however, this is not required. In one non-limiting aspect, the first layer includes at least about 80 weight percent polyvinylidene fluoride. In another and/or alternative non-limiting aspect, the first layer of the reflective film material includes at least about 90 weight percent polyvinylidene fluoride. In still another and/or alternative non-limiting aspect, the first layer of the reflective film material includes about 95-100 weight percent polyvinylidene fluoride. The second layer of the reflective film material includes polyvinylidene fluoride and at least one vinyl polymer. The polyvinylidene fluoride and at least one vinyl polymer constitutes about 60-100 weight percent of the second layer. The polyvinylidene fluoride constitutes a majority weight percent of the second layer. Generally, the polyvinylidene fluoride constitutes about 60-99.5 weight percent of the second layer, typically about 75-99 weight percent of the second layer, and more typically about 85-95 weight percent of the second layer. The vinyl polymer in generally constitutes about 2-45 weight percent of the second layer, typically about 10-30 weight percent of the second layer, and more typically about 15-25 weight percent of the second layer. Non-limiting examples of vinyl polymer that can be used include, but are not limited to, polyethylene, polypropylene, polystyrene, poly(vinyl chloride), polyisobutylene, and/or poly(methyl methacrylate). In one non-limiting embodiment, a majority of the vinyl polymer includes poly(methyl methacrylate). The second layer can include a one or more additional materials. Such other materials can constitute up to about 40 weight percent of the second layer. Generally, the one or more other materials constitutes about 0.1-35 weight percent of the second layer of the reflective film material, typically about 0.5-20 weight percent of the second layer of the reflective film material, and more typically about 1-8 weight percent of the second layer of the reflective film material. The one or more other materials can include, but are not limited to, impact modifiers, pigments, dyes, pigments, dyes, biocides, light stabilizers, adhesion promoter, fire retardant, etc. Generally, the second layer includes at least one pigment and/or dye and at least one impact modifier; however, this is not required. Non-limiting examples of impact modifiers include, but are not limited to, functional and/or nonfunctional ethylene, acrylic-based polypropylene, ABS, polyester (e.g., PBT, PET, etc.), PVC, polycarbonate, etc. The impact modifiers, when included in the second layer, generally constitutes about 0.1-30 weight percent of the second layer of the reflective film material, typically about 0.2-15 weight percent of the second layer of the reflective film material, and more typically about 1-4 weight percent of the second layer of the reflective film material. Non-limiting examples of pigments include, but are not limited to, titanium dioxide, calcium carbonate, etc. In one non-limiting embodiment of the invention, the pigment, when used, is a white or generally white pigment. The pigments and/or dyes, when included in the second layer, generally constitutes about 0.1-10 weight percent of the second layer of the reflective film material, typically about 0.2-8 weight percent of the second layer of the reflective film material, and more typically about 1-6 weight percent of the second layer of the reflective film material. The reflective film material can include a third layer or include a second layer as an alternative to the second layer discussed above. The third layer or alternative second layer of the reflective film material includes polyvinylidene fluoride and at least one vinyl polymer. The polyvinylidene fluoride and at least one vinyl polymer about 60-100 weight percent of the third layer or alternative second layer. The polyvinylidene fluoride constitutes less than a majority weight percent of the third layer or alternative second layer. Generally, the polyvinylidene fluoride constitutes about 2-45 weight percent of the third layer or alternative second layer, typically about 10-30 weight percent of the third layer or alternative second layer, and more typically about 15-25 weight percent of the third layer or alternative second layer. The vinyl polymer in generally constitutes about 55-98 weight percent of the third layer or alternative second layer, typically about 60-95 weight percent of the third layer or alternative second layer, and more typically about 70-85 weight percent of the third layer or alternative second layer. Non-limiting examples of vinyl polymer that can be used include, but are not limited to, polyethylene, polypropylene, polystyrene, poly (vinyl chloride), polyisobutylene, and/or poly(methyl methacrylate). In one non-limiting embodiment, a majority of the vinyl polymer includes poly(methyl methacrylate). The third layer or alternative second layer can include a second and/or third block of material. The third layer or alternative second layer can include a one or more additional materials. Such other materials can constitute up to about 40 weight percent of the third layer or alternative second layer. Generally, the one or more other materials constitutes about 0.1-35 weight percent of the third layer or alternative second layer of the reflective film material, typically about 0.5-20 weight percent of the third layer or alternative second layer of the reflective film material, and more typically about 1-8 weight percent of the third layer or alternative second layer of the reflective film material. The one or more other materials can include, but are not limited to, impact modifiers, pigments, dyes, pigments, dyes, biocides, light stabilizers, adhesion promoter, fire retardant, etc. Generally, the second layer includes at least one impart modifier and at least one adhesion promoter; however, this is not required. Non-limiting examples of impact modifiers include, but are not limited to, functional and/or non-functional ethylene, acrylic-based polypropylene, ABS, polyester (e.g., PBT, PET, etc.), PVC, polycarbonate, etc. The impact modifiers, when included in the third layer or alternative second layer, generally constitutes about 0.1-30 weight percent of the third layer or alternative second layer of the reflective film material, typically about 0.2-15 weight percent of the third layer or alternative second layer of the reflective film material, and more typically about 1-4 weight percent of the third layer or alternative second layer of the reflective film material. In one non-limiting embodiment of the invention, the adhesion promoters, when used, include, but are not limited to, organosilicone compounds (e.g., aminopropyltriethoxysilane, vinyltriethoxy silane), dynasylan, etc. The adhesion promoter, when used, facilitates in securing reinforcement material to the reflective film material. The thickness of the each layer of the reflective film material can be the same or different. Generally, the total thickness of the reflective film material is about 0.5-20 mils, typically about 1-10 mils, and more typically about 1-5 mils. More than one layer of reflective film material can be applied to the roofing and/or siding material. When more than one layer of reflective film material is used, one or more layers of reinforcement fabric can be inserted between two layers of the reflective film material; however, this is not required. When two of more layers of reflective film material are used, the film layers can be secured together by an adhesive, melted bond, etc. Non-limiting examples of the reflective film material are set forth as follows:

EXAMPLE 1

| First Layer | |
|---|---|
| Polyvinylidene fluoride | 70-100 wt % |
| Optional components (pigments, dyes, biocides, light stabilizers, impact modifiers, adhesion promoter, fire retardant, etc.) | 0-30 wt % |
| Second Layer | |
| Polyvinylidene fluoride | 33-98 wt % |
| Vinyl polymer | 1.2-45 wt % |
| Optional components (pigments, dyes, biocides, light stabilizers, impact modifiers, adhesion promoter, fire retardant, etc.) | 0-40 wt % |

EXAMPLE 2

| First Layer | |
|---|---|
| Polyvinylidene fluoride | 70-100 wt % |
| Optional components (pigments, dyes, biocides, light stabilizers, impact modifiers, adhesion promoter, fire retardant, etc.) | 0-30 wt % |
| Second Layer | |
| Polyvinylidene fluoride | 33-98 wt % |
| Vinyl polymer | 1.2-45 wt % |
| Optional components (pigments, dyes, biocides, light stabilizers, impact modifiers, adhesion promoter, fire retardant, etc.) | 0-40 wt % |
| Third Layer | |
| Polyvinylidene fluoride | 1.2-45 wt % |
| Vinyl polymer | 33-98 wt % |
| Optional components (pigments, dyes, biocides, light stabilizers, impact modifiers, adhesion promoter, fire retardant, etc.) | 0-40 wt % |

EXAMPLE 3

| First Layer | |
| --- | --- |
| Polyvinylidene fluoride | 85-100 wt % |
| Optional components | 0-15 wt % |
| (pigments, dyes, biocides, | |
| light stabilizers, impact | |
| modifiers, adhesion | |
| promoter, fire retardant, etc.) | |
| Second Layer | |
| Polyvinylidene fluoride | 60-98 wt % |
| Vinyl polymer | 2-40 wt % |
| (at least 70% PMMA) | |
| Pigment/dye | 0.1-10 wt % |
| Impact modifier | 0.1-30 wt % |
| Dyes, biocides, | 0-20 wt % |
| light stabilizers, | |
| adhesion promoter, | |
| fire retardant, etc. | |

EXAMPLE 4

| First Layer | |
| --- | --- |
| Polyvinylidene fluoride | 85-100 wt % |
| Optional components | 0-15 wt % |
| (biocides, light stabilizers, | |
| impact modifiers, fire | |
| retardant, etc.) | |
| Second Layer | |
| Polyvinylidene fluoride | 60-98 wt % |
| Vinyl polymer | 2-40 wt % |
| (at least 70% PMMA) | |
| Pigment/dye | 0.1-10 wt % |
| Impact modifier | 0.1-30 wt % |
| Dyes, biocides, | 0-20 wt % |
| light stabilizers, | |
| fire retardant, etc. | |
| Third Layer | |
| Polyvinylidene fluoride | 2-40 wt % |
| Vinyl polymer | 60-98 wt % |
| (at least 70% PMMA) | |
| Impact modifier | 0.1-30 wt % |
| Adhesion promoter | 0.1-10 wt % |
| Pigment, dyes, biocides, | 0-20 wt % |
| light stabilizers, fire | |
| retardant, etc. | |

In still yet another and/or alternative non-limiting aspect of the present invention, the reflective film material can include a granule material and/or be applied on the top surface of a granule material. The granule material can include a) common granular materials as disclosed above in the patents and patent applications incorporated by reference, b) granular material that is the same as or similar to the granular material disclosed in United States Patent Publication No. 20040071938, and/or c) other solid material such as, but not limited to, broken or crushed glass, graphite, polymer material (e.g., polymer balls, plastic beads, etc.), sand, metal (e.g., metal flakes, metal balls, etc.).

It is a principal object of the present invention to provide an improved roofing and/or siding system that has an result or effective reflectivity of at least about 60%.

Another and/or alternative object of the present invention is the provision of a roofing and/or siding system having an exposed surface of highly reflective material.

Still another and/or alternative object of the present invention is the provision of a roofing and/or siding system that includes one or more layers of a highly reflective film.

Still yet another and/or alternative object of the present invention is the provision of a roofing and/or siding system having highly reflective properties that can be manufactured off-site and have the desired resulting or effective reflectivity.

A further and/or alternative object of the present invention is the provision of a roofing and/or siding system which has a desired weatherability, desired strength and color stability as well as a desired heat stability.

Still a further and/or alternative object of the present invention is the provision of a roofing and/or siding system that is commercially feasible and economical to manufacture.

Another and/or alternative object of the present invention is the provision of a roofing and/or siding system that has a reduced surface temperature when exposed to sunlight.

Still another and/or alternative object of the present invention is the provision of a roofing and/or siding system that reduces energy costs associated with the cooling of a structure.

Yet another and/or alternative object of the present invention is the provision of a roofing and/or siding system that resists heat degradation.

These and other objects and advantages will become apparent to those skilled in the art upon reading and following the description taken together with the accompanying drawings.

BRIEF DESCRIPTION OF THE DRAWINGS

Reference may now be made to the drawings which illustrate various preferred embodiments that the invention may take in physical form and in certain parts and arrangement of parts wherein.

DETAILED DESCRIPTION OF THE PREFERRED EMBODIMENTS

Figure 1:
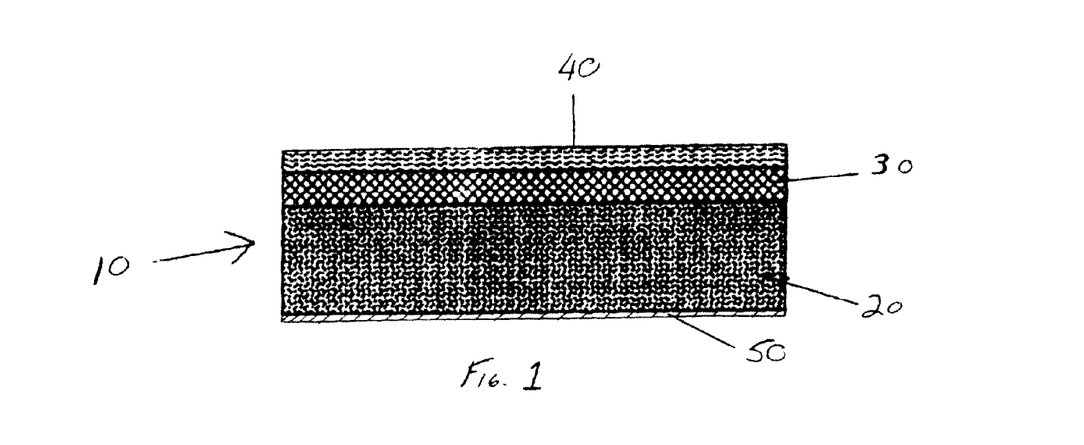
FIG. 1 is a cross-section view of a roofing and/or siding material in accordance with the present invention; and, FIG. 2 is a cross-section view of the film material and reinforcement material in accordance with the present invention.

Referring now to the drawings wherein the showings are for the purpose of illustrating a preferred embodiment of the invention only and not for the purpose of limiting same, FIG. 1 illustrates a roofing and/or siding material 10 in accordance with the present invention. The roofing and/or siding material 10 includes a base sheet/membrane 20; a reinforcement material 30; and a reflective film material 40. Base sheet/membrane 20 is illustrated as being a modified bitumen composite wherein the modifier is selected from atactic polypropylene (APP), styrene-butadiene-styrene (SBS), styrene-ethylene-butadiene-styrene (SEGS) and styrene-butadiene rubber (SBR); however, it can be appreciated that the base sheet/membrane 20 can be formed of other materials. The thickness of base sheet/membrane 20 that is form of modified bitumen composite is about 0.5-30 mm, and typically about 5-20 mm. The base sheet/membrane 20 that is form of modified bitumen composite can include a scrim material, not shown, of polyethylene, polyester of the like having a thickness of about 0.02-1 mm. The scrim material is generally designed provide strength to the composite membrane. The composition and manufacturing process for forming modified bitumen composite is known in the art as described in United States Patent Publication No. 20040071938 published on Apr. 15, 2004, which is incorporated herein by reference, thus will not be described further.

The bottom surface of the base sheet/membrane 20 includes a removable film sheet 50. The film sheet is generally formed of a polymer material; however, sheet 50 can be formed of other material (e.g., paper, etc.). The film sheet is designed to preform one or more functions, namely, 1) reduce the incidence of adhesion of the bottom of the base sheet/membrane 20 to a top surface of the reflective film material 40 when the roofing and/or siding material 10 is rolled into a roll for shipping and/or storage, 2) reduce the incidence of damage to the bottom of the base sheet/membrane 20 and/or to the top surface of the reflective film material 40 when the roofing and/or siding material 10 is rolled into a roll for shipping and/or storage, 3) prevent or reduce the incidence of discoloration of the top surface of the reflective film material 40 by the bottom of the base sheet/membrane 20 when the roofing and/or siding material 10 is rolled into a roll for shipping and/or storage, and/or 4) improve the ease of unrolling roofing and/or siding material 10. The removable film sheet 50 and/or bottom of the base sheet/membrane 20 can include an adhesive to maintain the removable film sheet 50 on the bottom of the base sheet/membrane 20 and to also enable the removable film sheet 50 to be easily removed from the bottom of the base sheet/membrane 20; however, it will be appreciated that the use of an adhesive is not required. The thickness of the removable film sheet 50 is generally about 0.2-2 mils; however, other thicknesses can be used. The color of the removable film sheet 50 is generally white; however, other colors can be used.

The reinforcement material 30 is generally a polyester and/or fiberglass material. The reinforcement material 30 is generally a woven material; however, the reinforcement material 30 can be a non-woven material or a combination of a woven or non-woven material. The thickness of the reinforcement material 30 is generally about 0.5-2 mils; however, other thicknesses can be used. The reinforcement material 30 is illustrate as being positioned on the top surface of the base sheet/membrane 20; however, it will be appreciated that the reinforcement material 30 can be at least partially embedded in the top surface of the base sheet/membrane 20.

Although not shown, the top surface of the base sheet/membrane 20 can include granules that are partially or fully embedded in the top surface of the base sheet/membrane 20. The granules, when used, are generally derived from a mineral base rock such as greenstone, greystone, nephylene syenite, gravel slate, gannister, granite, quartzite, andosite, rhyolite and the like. The granules, when used, may be coated to color the granules and/or provide the granules with antimicrobial resistance. The granules generally have a variety of different shapes and sizes.

Reflective film material 40 is designed and formulated to created a resulting reflectivity of at least about 50% on the roofing and/or siding system. Typically, the reflective film material 40 is designed and formulated to created a resulting reflectivity of at least about 70% on the roofing and/or siding system, more typically a resulting reflectivity of about 72-95% on the roofing and/or siding system, and even more typically a resulting reflectivity of about 75-90% on the roofing and/or siding system.

Figure 2:
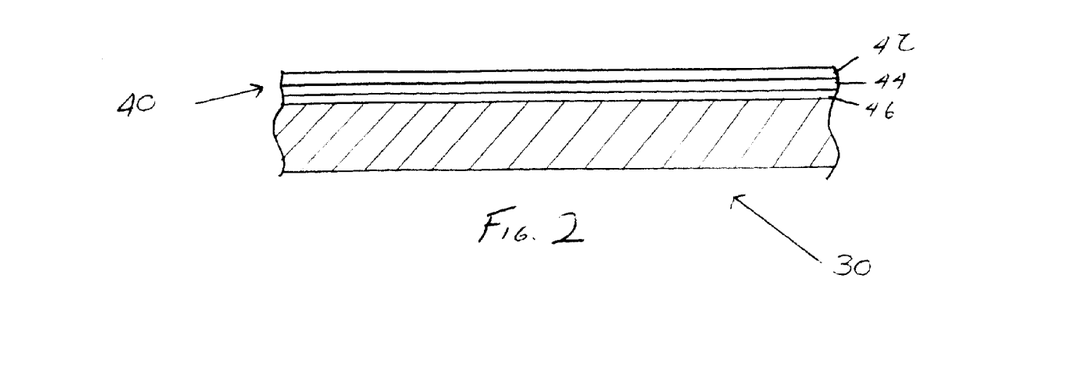

The reflective film material 40 is formed of multiple layers as illustrated in FIG. 2. FIG. 2 illustrates the reflective film material 40 as including three layers 42, 44, 46; however, it can be appreciated that the reflective film material 40 can include two layer or more than three layers. Top or first layer 42 is generally formed of durable, UV-resistant material. One such material is polyvinylidene fluoride. Generally, top layer 42 includes about 96-100 weight percent polyvinylidene fluoride. The thickness of top layer 42 is generally less than about 4 mils, and typically about 0.1-2 mils. The color of the top layer is generally clear; however, the top layer can include one or more coloring pigments and/or dyes. The middle or second layer 44 of the reflective film material 40 is formed of at least a blend of polyvinylidene fluoride and vinyl polymer such as, but not limited to, poly(methyl methacrylate). The blend of polyvinylidene fluoride and vinyl polymer generally constitutes at least about 80 weight percent of middle layer 44, and typically at least about 90 weight percent of middle layer 44. The blend of polyvinylidene fluoride and vinyl polymer generally includes at least 70 weight percent polyvinylidene fluoride and up to about 30 weight percent vinyl polymer. Typically, the blend of polyvinylidene fluoride and vinyl polymer includes about 75-90 weight percent polyvinylidene fluoride and about 10-25 weight percent vinyl polymer. The middle layer can include secondary materials; however, this is not required. For instance, middle layer can include pigments, dyes, biocides, light stabilizers, impact modifiers, thickeners, stabilizers, adhesion promoters, fire retardants, etc. The secondary materials in the middle layer generally constitutes less than about 40 weight percent of middle layer 44, and typically about 1-15 weight percent of middle layer 44. Generally, the middle layer includes one or more pigments and/or dyes. One non-limiting pigment that can be used is titanium dioxide. The one or more pigments and/or dyes in the middle layer, when used, generally constitutes about 1-10 weight percent of the middle layer, and typically about 3-6 weight percent of the middle layer. The middle layer also generally includes one or more impact modifiers. Non-limiting examples of impact modifiers include, but are not limited to, functional and/or nonfunctional ethylene, acrylic-based polypropylene, ABS, polyester (e.g., PBT, PET, etc.), PVC, polycarbonate, etc. The one or more impact modifiers, when used, generally constitute about 0.5-8 weight percent of the middle layer, and typically about 1-5 weight percent of the middle layer. The thickness of middle layer 44 is generally less than about 4 mils, and typically about 0.1-2 mils. The color of the middle layer is generally white; however, the middle layer can have other colors. The bottom or third layer 46 of the reflective film material 40 is also formed of at least a blend of polyvinylidene fluoride and vinyl polymer such as, but not limited to, poly (methyl methacrylate). Typically, the blend of polyvinylidene fluoride and vinyl polymer includes about 10-25 weight percent polyvinylidene fluoride and about 5-90 weight percent vinyl polymer. The bottom layer can include secondary materials; however, this is not required. For instance, the bottom layer can include pigments, dyes, biocides, light stabilizers, impact modifiers, thickeners, stabilizers, adhesion promoters, fire retardants, etc. The secondary materials in the bottom layer generally constitutes less than about 40 weight percent of bottom layer 46, and typically about 1-15 weight percent of bottom layer 4. Generally, the bottom layer includes one or more adhesion promoters. One non-limiting adhesion promoter that can be used is DYNASYLAN® Hydrosil 2909. The one or more adhesion promoters in the bottom layer, when used, generally constitutes about 1-15 weight percent of the bottom layer, and typically about 2-10 weight percent of the bottom layer. The bottom layer also generally includes one or more impact modifiers. Non-limiting examples of impact modifiers include, but are not limited to, functional and/or nonfunctional ethylene, acrylic-based polypropylene, ABS, polyester (e.g., PBT, PET, etc.), PVC, polycarbonate, etc. The one or more impact modifiers, when used, generally constitute about 0.5-8 weight percent of the bottom layer, and typically about 1-5 weight percent of the bottom layer. The thickness of bottom layer 46 is generally less than about 4 mils, and typically about 0.1-2 mils. The color of the bottom layer is generally clear; however, the bottom layer can have other colors. One non-limiting formulation of reflective film material 40 is as follows:

EXAMPLE A

| First Layer | |
|---|---|
| Polyvinylidene fluoride | 96-100 wt % |
| Optional components (biocides, light stabilizers, impact modifiers, fire retardant, etc.) | 0-4 wt % |
| Second Layer | |
| Blend | 90-97 wt % |
| Polyvinylidene fluoride | 75-90 wt % of Blend |
| Vinyl polymer (at least 90% PMMA) | 10-25 wt % of Blend |
| Impact modifier | 1-5 wt % |
| Pigment/dye | 2-8 wt % |
| Dyes, biocides, light stabilizers, fire retardant, etc. | 0-8 wt % |
| Third Layer | |
| Blend | 85-97 wt % |
| Polyvinylidene fluoride | 10-25 wt % of Blend |
| Vinyl polymer (at least 70% PMMA) | 75-90 wt % of Blend |
| Impact modifier | 1-5 wt % |
| Adhesion promoter | 0.5-10 wt % |
| Pigment, dyes, biocides, light stabilizers, fire retardant, etc. | 0-8 wt % |

As illustrated in FIGS. 1 and 2, the reinforcement material 30 is shown to be secured to the bottom surface of the reflective film material 40. When the reinforcement material 30 is secured to the bottom surface of the reflective film material 40 by an adhesive, the reinforcement material 30 generally secured to the bottom surface of the reflective film material 40. When the reinforcement material 30 is at least partially secured to the bottom surface of the reflective film material 40 by a heat lamination process and/or other type of heating process, the reinforcement material 30 generally at least partially embedded in the bottom surface of the reflective film material 40.

In one processing system for manufacturing a roofing and/or siding material 10 in accordance with the present invention, a multilayer reflective film material 40 is provided that includes reinforcement material 30 at least partially heat laminated to the bottom surface of reflective film material 40. The top surface of base sheet/membrane 20 is heated to a temperature to cause the top surface to soften. Thereafter, the bottom surface of reflective film material 40 that includes reinforcement material 30 is laid onto the softened top surface of base sheet/membrane 20. One or more pressure rollers can be used to press together the top surface of base sheet/membrane 20 and the bottom surface of reflective film material 40 that includes reinforcement material 30. The pressure rollers and/or some other pressure creating arrangement is used to cause a portion of the reinforcement material 30 to become at least partially embedded into the reinforcement material 30.

An adhesive can also or alternatively be used to secure the top surface of base sheet/membrane 20 to the bottom surface of reflective film material 40 that includes reinforcement material 30. A removable film sheet 50 is applied to the bottom surface of base sheet/membrane 20 prior to the roofing and/or siding material 10 being rolled into a roll.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

We claim:

1. A process for forming a roofing and/or siding material having a resulting reflectivity of at least about 50% comprising the steps of:
   a. providing a base sheet/membrane;
   b. providing a highly reflective composite material, said highly reflective composite material including a reinforcement material and a multi-layer reflective film material, said reinforcement material at least partially embedded in a bottom surface of said multi-layer reflective film material, a top surface of said multi-layer reflective film material having a resulting reflectivity of at least about 50%, said multi-layer reflective film material including at least two layers, a first layer comprises a majority weight percent polyvinylidene fluoride and a second layer comprises a mixture of polyvinylidene fluoride and vinyl polymer, a weight percent of said polyvinylidene fluoride in said second layer greater than a weight percent of said vinyl polymer; and,
   c. securing a) said reinforcement material, b) said bottom surface of said multi-layer reflective film material, or or a) and b) to a top surface of said base sheet/membrane.

2. The process as defined in claim 1, wherein said base sheet/membrane is a bitumen membrane or a modified bitumen membrane.

3. The process as defined in claim 1, including the step of applying a removable film sheet to a bottom surface of said base sheet/membrane.

4. The process as defined in claim 1, wherein said multi-layer reflective film material includes at least three layers, a first layer comprises a majority weight percent polyvinylidene fluoride, a second layer comprises a mixture of polyvinylidene fluoride and vinyl polymer, and a third layer comprises a mixture of polyvinylidene fluoride and vinyl polymer, said second layer including a majority weight percent polyvinylidene fluoride, said third layer including a majority weight percent vinyl polymer.

5. The process as defined in claim 1, wherein said first layer has a different composition from said second layer, said first layer including at least about 70 weight percent polyvinylidene fluoride, said second layer including about 2-45 weight percent vinyl polymer and at least 60 weight percent polyvinylidene fluoride.

6. The process as defined in claim 5, wherein said first layer including by weight percent:

| | |
|---|---|
| Polyvinylidene fluoride | 70-100 wt % |
| Optional components | 0-30 wt % | and said second layer including by weight percent:

| | |
|---|---|
| Polyvinylidene fluoride | 33-98 wt % |
| Vinyl polymer | 1.2-45 wt % |
| Optional components | 0-40 wt % | and wherein said optional components for both said first and second layers include one or more components selected from the group consisting of pigment, dye, biocide, light stabilizer, impact modifier, adhesion promoter and fire retardant.

7. The process as defined in claim 6, wherein said first layer including by weight percent:

| | |
|---|---|
| Polyvinylidene fluoride | 85-100 wt % |
| Optional components | 0-15 wt % | and said second layer including by weight percent:

| | |
|---|---|
| Polyvinylidene fluoride | 60-98 wt % |
| Vinyl polymer | 2-40 wt % |
| Pigment/dye | 0.1-10 wt % |
| Impact modifier | 0.1-30 wt % |
| Optional components | 0-20 wt % | and wherein said optional components for said first layer includes one or more components selected from the group consisting of pigment, dye, biocide, light stabilizer, impact modifier, adhesion promoter and fire retardant, said optional components for said second layer include one or more components selected from the group consisting of dye, biocide, light stabilizer, adhesion promoter, and fire retardant.

8. The highly reflective composite material as defined in claim 4, wherein said third layer includes by weight percent:

| | |
|---|---|
| Polyvinylidene fluoride | 1.2-45 wt % |
| Vinyl polymer | 33-98 wt % |
| Optional components | 0-40 wt % | and said optional components for said third layer include one or more components selected from the group consisting of pigment, dye, biocide, light stabilizer, impact modifier, adhesion promoter and fire retardant.

9. A process for forming a roofing and/or siding material having a resulting reflectivity of at least about 50% comprising the steps of:
a. providing a base sheet/membrane;
b. providing a highly reflective composite material, said highly reflective composite material comprising a multi-layer reflective film material, said top surface of said multi-layer reflective film material having a resulting reflectivity of at least about 50%, said multi-layer reflective film material including first and second layers, said first layer a top layer and said second layer positioned adjacent to and beneath said first layer, said first layer including 70-100 weight percent polyvinylidene fluoride and 0-30 weight percent optional components, said second layer including 33-98 weight percent polyvinylidene fluoride, 1.2-45 weight percent vinyl polymer, and 0-40 weight percent optional components, a weight percent of said polyvinylidene fluoride in said second layer greater than a weight percent of said vinyl polymer, said optional components for both said first and second layers include one or more components selected from the group consisting of pigment, dye, biocide, light stabilizer, impact modifier, adhesion promoter and fire retardant; and,
c. securing said reflective film material to a top surface of said base sheet/membrane.

10. The process as defined in claim 9, wherein said roofing and/or siding material is preformed prior to transporting said roofing and/or siding material to an installation site.

11. The process as defined in claim 9, wherein said first layer is clear and said second layer has a white color.

12. The process as defined in claim 10, wherein said first layer is clear and said second layer has a white color.

13. The process as defined in claim 9, wherein said first layer including by weight percent:

| | |
|---|---|
| Polyvinylidene fluoride | 85-100 wt % |
| Optional components | 0-15 wt % | and said second layer including by weight percent:

| | |
|---|---|
| Polyvinylidene fluoride | 60-98 wt % |
| Vinyl polymer | 2-40 wt % |
| Pigment/dye | 0.1-10 wt % |
| Impact modifier | 0.1-30 wt % |
| Optional components | 0-20 wt % | and wherein said optional components for said first layer includes one or more components selected from the group consisting of pigment, dye, biocide, light stabilizer, impact modifier, adhesion promoter and fire retardant, said optional components for said second layer include one or more components selected from the group consisting of dye, biocide, light stabilizer, adhesion promoter, and fire retardant.

14. The process as defined in claim 12, wherein said first layer including by weight percent:

| | |
|---|---|
| Polyvinylidene fluoride | 85-100 wt % |
| Optional components | 0-15 wt % | and said second layer including by weight percent:

| | |
|---|---|
| Polyvinylidene fluoride | 60-98 wt % |
| Vinyl polymer | 2-40 wt % |
| Pigment/dye | 0.1-10 wt % |

-continued

| | |
|---|---|
| Impact modifier | 0.1-30 wt % |
| Optional components | 0-20 wt % | and wherein said optional components for said first layer includes one or more components selected from the group consisting of pigment, dye, biocide, light stabilizer, impact modifier, adhesion promoter and fire retardant, said optional components for said second layer include one or more components selected from the group consisting of dye, biocide, light stabilizer, adhesion promoter, and fire retardant.

15. The process as defined in claim 9, wherein said first layer including by weight percent:

| | |
|---|---|
| Polyvinylidene fluoride | 96-100 wt % |
| Optional components | 0-4 wt % | and second layer including 90-97 weight percent polyvinylidene fluoride and vinyl polymer including by weight percent:

| | |
|---|---|
| Polyvinylidene fluoride | 75-90 wt % of Blend |
| Vinyl polymer (at least 90% PMMA) | 10-25 wt % of Blend |
| Impact modifier | 1-5 wt % |
| Pigment/dye | 2-8 wt % |
| Optional components | 0-8 wt % | and wherein said optional components for said first layer include one or more components selected from the group consisting of biocide, light stabilizer, impact modifier, and fire retardant, said optional components for said second layer include one or more components selected from the group consisting of dye, biocide, light stabilizer, and fire retardant.

16. The process as defined in claim 14, wherein said first layer including by weight percent:

| | |
|---|---|
| Polyvinylidene fluoride | 96-100 wt % |
| Optional components | 0-4 wt % | and second layer including 90-97 weight percent polyvinylidene fluoride and vinyl polymer including by weight percent:

| | |
|---|---|
| Polyvinylidene fluoride | 75-90 wt % of Blend |
| Vinyl polymer (at least 90% PMMA) | 10-25 wt % of Blend |
| Impact modifier | 1-5 wt % |
| Pigment/dye | 2-8 wt % |
| Optional components | 0-8 wt % | and wherein said optional components for said first layer include one or more components selected from the group consisting of biocide, light stabilizer, impact modifier, and fire retardant, said optional components for said second layer include one or more components selected from the group consisting of dye, biocide, light stabilizer, and fire retardant.

17. The process as defined in claim 9, wherein said highly reflective composite material includes a third layer, said third layer positioned adjacent to and beneath said second layer, said third layer includes by weight percent:

| | |
|---|---|
| Polyvinylidene fluoride | 1.2-45 wt % |
| Vinyl polymer | 33-98 wt % |
| Optional components | 0-40 wt % | and said optional components for said third layer include one or more components selected from the group consisting of pigment, dye, biocide, light stabilizer, impact modifier, adhesion promoter and fire retardant.

18. The process as defined in claim 12, wherein said highly reflective composite material includes a third layer, said third layer positioned adjacent to and beneath said second layer, said third layer includes by weight percent:

| | |
|---|---|
| Polyvinylidene fluoride | 1.2-45 wt % |
| Vinyl polymer | 33-98 wt % |
| Optional components | 0-40 wt % | and said optional components for said third layer include one or more components selected from the group consisting of pigment, dye, biocide, light stabilizer, impact modifier, adhesion promoter and fire retardant.

19. The process as defined in claim 16, wherein said highly reflective composite material includes a third layer, said third layer positioned adjacent to and beneath said second layer, said third layer includes by weight percent:

| | |
|---|---|
| Polyvinylidene fluoride | 1.2-45 wt % |
| Vinyl polymer | 33-98 wt % |
| Optional components | 0-40 wt % | and said optional components for said third layer include one or more components selected from the group consisting of pigment, dye, biocide, light stabilizer, impact modifier, adhesion promoter and fire retardant.

20. The process as defined in claim 17, wherein said third layer includes 85-97 weight percent of polyvinylidene fluoride and vinyl polymer, said third layer includes by weight percent:

| | |
|---|---|
| Polyvinylidene fluoride | 10-25 wt % of Blend |
| Vinyl polymer (at least 70% PMMA) | 75-90 wt % of Blend |
| Impact modifier | 1-5 wt % |
| Adhesion promoter | 0.5-10 wt % |
| Optional components | 0-8 wt % | and said optional components for said third layer include one or more components selected from the group consisting of pigment, dye, biocide, light stabilizer, fire retardant.

21. The process as defined in claim 19, wherein said third layer includes 85-97 weight percent of polyvinylidene fluoride and vinyl polymer, said third layer includes by weight percent:

| | |
|---|---|
| Polyvinylidene fluoride | 10-25 wt % of Blend |
| Vinyl polymer (at least 70% PMMA) | 75-90 wt % of Blend |
| Impact modifier | 1-5 wt % |
| Adhesion promoter | 0.5-10 wt % |
| Optional components | 0-8 wt % | and said optional components for said third layer include one or more components selected from the group consisting of pigment, dye, biocide, light stabilizer, fire retardant.

22. The process as defined in claim 9, wherein said highly reflective composite material includes a reinforcement material positioned on the bottom of said highly reflective composite material, said reinforcement material secured to said top surface of said base sheet/membrane.

23. The process as defined in claim 21, wherein said highly reflective composite material includes a reinforcement material positioned on the bottom of said highly reflective composite material, said reinforcement material secured to said top surface of said base sheet/membrane.

* * * * *